Feb. 20, 1945.   H. C. FREED   2,370,027
ELECTROMAGNETICALLY CONTROLLED COUPLING DEVICE
Filed May 24, 1943
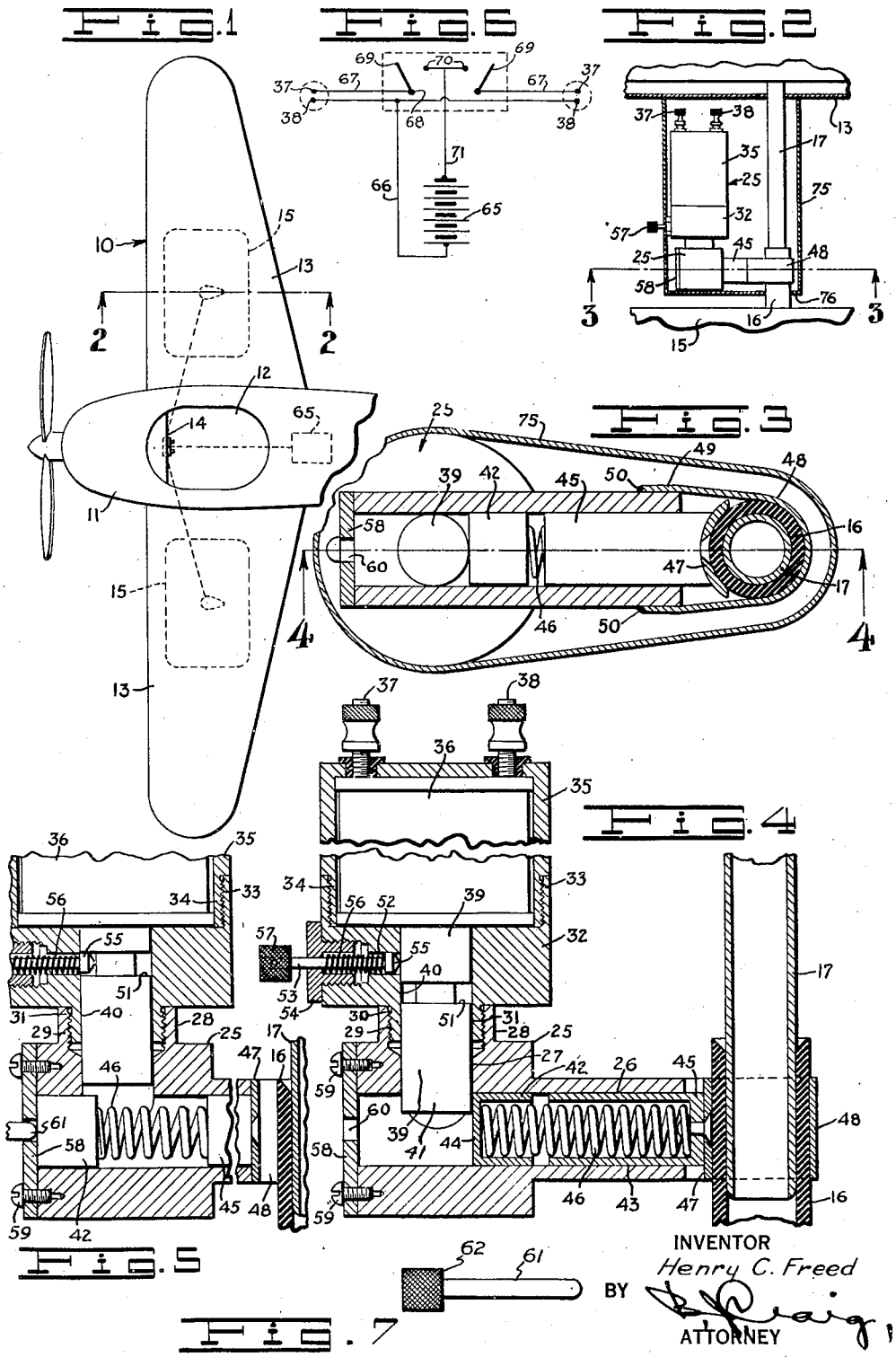
INVENTOR
Henry C. Freed
BY
ATTORNEY Patented Feb. 20, 1945

2,370,027

UNITED STATES PATENT OFFICE 2,370,027

ELECTROMAGNETICALLY CONTROLLED COUPLING DEVICE

Henry C. Freed, Glendale, Calif.

Application May 24, 1943, Serial No. 488,148

7 Claims. (Cl. 285—84)

This invention relates to an improvement in electromagnetically controlled coupling devices.

The general object of the invention is to provide an improved coupling device by means of which two conduits may be held in connected position and may be readily released by operation of a switch device.

A further object of the invention is to provide a coupling device including means for normally maintaining a clamping member upon a conduit and wherein novel means is provided for releasing the member from engaged position.

A more specific object of the invention is to provide a coupling device including a spring pressed member normally maintaining a plurality of conduits in coupled position and wherein electrically operated means serves to release the coupling so that the conduits may readily separate.

A further object of the invention is to provide a coupling device for coupling a pair of telescoped conduits including spring means for holding the parts in engaged position and including solenoid operating means for releasing the spring means.

A further object of my invention is to provide a novel electrically operated device for coupling a fuel supply conduit of an airplane to the discharge pipe of a fuel drop tank.

Other objects and advantages of my invention will be apparent from the following description taken in connection with the accompanying drawing wherein:

Fig. 1 is a diagrammatic, fragmentary, top plan view showing my invention applied to an airplane;

Fig. 2 is an enlarged section taken on line 2—2, Fig. 1, showing the coupling member;

Fig. 3 is an enlarged section taken on line 3—3, Fig. 2;

Fig. 4 is a sectional view taken on line 4—4, Fig. 3;

Fig. 5 is a fragmentary section similar to Fig. 4 showing the parts in another position, and Fig. 6 is a wiring diagram.

Referring to the drawing by reference characters, I have shown my invention as applied to an airplane which is indicated generally at 10. The airplane shown includes a fuselage 11 having a cockpit 12 therein and having wings 13 thereon. The cockpit includes an instrument panel 14.

Each wing is shown as provided with a fuel drop tank indicated at 15. These drop tanks are preferably made of bullet-proof material and are suitably held in place for release when desired. The particular construction of the drop tanks and the manner in which they are held and released forms no part of the present invention.

The present invention contemplates the provision of means for connecting a flexible conduit shown at 16 to a second conduit 17 over which the flexible conduit is telescoped.

As shown in the drawing the flexible conduit 16 communicates with the drop tank 15 while the more or less rigid conduit 17 extends into the airplane and is suitably connected to the engine or engines in any desired manner. The construction is such that fuel is drawn from the tank 15 through the conduits 16 and 17 and then on to the engine.

Drop tanks are employed to increase the radius of operation or the distance which an airplane can fly without refueling. When the fuel in the drop tanks is exhausted or when for other reasons it is desirable to lighten the load, the drop tanks are released and fall from the airplane. The connection between the drop tank conduit and airplane fuel supply conduit must be releasable and heretofore fuel supply lines have frequently leaked at the point of connection to the drop tank. This has resulted in motor inefficiency. My invention seeks to overcome this objection.

According to the disclosure, in constructing my coupling member I employ a body 25 which has a lateral bore 26 and a vertical bore 27 which intersects the lateral bore. The bore 26 is open at both ends. The body 25 at one end has an upwardly projecting sleeve 28 thereon which is internally threaded as at 29 and engages external threads 30 on a collar 31 arranged on a support 32. The support 32 includes an upwardly extending threaded collar 33 which engages a threaded collar 34 on a solenoid housing 35.

Within the solenoid housing 35 I arrange a solenoid 36 which has terminals 37 and 38. The solenoid 36 includes a core 39 which extends through a bore 40 in the support 32. The bores 27 and 40 are coaxial. The core also extends into the bore 27. In lowered position the lower end portion 41 of the core forms a plunger which extends into the bore 26.

The bore 26 is provided with a pair of pistons 42 and 43. The inner piston 43 has a head 44 while the outer piston 43 has a head 45. A spring 46 is arranged within the pistons and normally urges them apart.

The piston head 45 is provided with an arcuate clamping member 47 while the body 25 is provided with a loop member 48 the ends 49 of which are welded as at 50 to the body. The loop member is of a size so that it engages approximately one-half the circumference of the conduit 16 while the clamping member 47 engages most of the remainder of the conduit.

The construction is such that when the core 39 is in the position shown in Fig. 4 the lower end of the core engages the end 44 of the piston 42 and the spring 46 forces the piston 43 outwardly causing the clamping member 47 to push against the conduit 16 and by reaction causing the loop member 48 to also pull against the conduit 16. As a result the conduit 16 is tightly held upon the conduit 17. When the solenoid is actuated the core 39 is drawn into the solenoid causing the end 41 of the core to pass out of engagement with the end 44 of the piston 42 thus freeing the latter and removing pressure from the piston 43 so that the conduit 16 is freed.

To hold the core 39 in withdrawn position it is provided with a peripheral groove 51 which, when the core is withdrawn, aligns with a bore 52 in the body 32. The bore 52 has a pin 53 slidable therein and slidable through a cap 54. The pin 53 has a head 55 thereon and is urged inwardly by a spring 56 which engages the head and the cap. The head 55 passes into the slot 51 and holds the core withdrawn until the head 55 is withdrawn by pulling upon a gripping portion 57 secured on the stem 53.

The bore 26 remote from the piston 43 is closed by a plate 58 removably held in place by screws 59. The plate 58 has a hole 60 therein through which the shank 61 on a loading member is inserted. The loading member includes a head 62.

In operation when the device is in the position shown in Fig. 4 and the solenoid is actuated, the plunger will be withdrawn and the parts will assume the position in Fig. 5.

When this occurs and it is desired to again place the clamping member in service position, the operator pulls on the gripping member 57 thus releasing the core 39. The core is normally projected downwardly when the current is off by a light spring (not shown) so that it will move down and engage upon the top of the piston 42. The loading member shank 61 is then inserted and the head 62 pushed causing the loading member to push the end 44 of the plunger 42 to the right in Fig. 5. This operation is continued until the end 44 clears the plunger 41 whereupon the plunger moves to engaged position shown in Fig. 4.

In Fig. 6 I show a wiring diagram for operating my device in connection with two drop tanks. As shown the circuit includes a battery 65 having a lead 66 which extends to the terminals 38. The terminals 37 are connected by leads 67 to contacts 68 on switch arm 69. The switch arm 69, when moved to closed position, engages a contact 70 which is connected by a lead 71 to the battery 65. Thus when either switch arm 69 is moved to engage a contact 70 the clamping member associated with that particular switch will be caused to operate through the energization of the associated solenoid.

I preferably surround the clamping member with a housing 75 which is suitably supported on the airplane. The body 25 is arranged on the bottom 76 of the housing.

From the foregoing description it will be apparent that I have invented a novel electro-magnetically controlled coupling device which can be readily manufactured and which is highly efficient for the purpose for which it is intended.

Having thus described my invention, I claim:

1. A conduit clamping member comprising a body having a bore therein, said bore having open ends, a pair of piston members slidable in said bore, resilient means normally urging said piston members apart, a clamping member fixed upon said body, said clamping member including a portion adapted to engage a flexible conduit, a conduit engaging member on one of said pistons, a plunger movable to a position in the path of the other piston, a solenoid on said body, a core for said solenoid, said plunger being secured to said core, said solenoid being constructed to pull the core so that the plunger end thereof clears said second piston, and means to hold said plunger in retracted position.

2. A conduit clamping member comprising a body having a bore therein, said bore having open ends, a pair of piston members slidable in said bore, resilient means normally urging said pistons apart, a looped clamping member fixed upon said body, said looped clamping member including a portion adapted to engage a flexible conduit, one of said pistons projecting beyond one end of said bore, an arcuate conduit engaging member on the projecting end of said piston, said body having a second bore intersecting said first bore, a plunger slidable in said second bore and movable to a position in the path of the other piston, a solenoid on said body, and a core for said solenoid, said plunger being secured to said core, said solenoid being constructed to pull the core so that the plunger end thereof clears said second piston.

3. A conduit clamping member comprising a body having a bore therein, said bore having open ends, a pair of piston members slidable in said bore, resilient means normally urging said piston members apart, a looped clamping member fixed upon said body, said looped clamping member including a portion adapted to engage a flexible conduit, one of said pistons projecting beyond one end of said bore, an arcuate conduit engaging member on the projecting end of said piston, said body having a second bore intersecting said first bore, a plunger slidable in said second bore and movable to a position in the path of the other piston, a solenoid on said body, a core for said solenoid, said plunger being secured to said core, said solenoid being constructed to pull the core so that the plunger end thereof clears said second piston, said plunger having a peripheral slot therein, said body having an aperture intersecting said second bore, a spring pressed pin in said aperture, said pin having a head adapted to enter said plunger slot in one position of said plunger, and a closure plate for closing the other end of said bore, said closure plate having a hole therein adapted to receive the tip of a loading tool.

4. A conduit clamping member including a body, a conduit engaging member movably mounted on said body, a clamping member fixed relative to said body, said clamping member including a portion adapted to engage a flexible conduit, said clamping member being aligned with said conduit engaging member, a stop member movably mounted on said body and movable to a position in the path of the conduit engaging member, a solenoid on said body, and a core for said solenoid, said stop member being connected to said core, said solenoid being constructed to pull the core so that the stop member clears said conduit engaging member.

5. A conduit clamping member comprising a body having a bore therein, piston means slidable in said bore, a clamping member fixed upon said body, said clamping member including a portion adapted to engage a flexible conduit, said piston means including a conduit engaging member, said conduit engaging member being aligned with said clamping member, a plunger slidable on said body and movable to a position in the path of the said piston means, a solenoid on said body, and a core for said solenoid, said plunger being secured to said core, said solenoid being constructed to pull the core so that the plunger clears said piston means.

6. A conduit clamping member comprising a body having a bore therein, said bore having open ends, a pair of piston members slidable in said bore, resilient means normally urging said piston members apart, a clamping member including a portion adapted to engage a flexible conduit, a conduit engaging member on one of said pistons and adapted to cooperate with said clamping member to hold a flexible tube in place, a plunger movable to a position in the path of the other piston, a solenoid on said body, a core for said solenoid, said plunger being secured to said core, said solenoid being constructed to pull the core so that the plunger end thereof clears said second piston.

7. A conduit clamping member comprising a body having a bore therein, said bore having open ends, piston means slidable in one end of said bore, a looped clamping member fixed upon said body, said looped clamping member including a portion adapted to engage a flexible conduit, said piston means having an arcuate conduit engaging member on the outer end thereof, said body having a second bore intersecting said first bore, a plunger slidable in said second bore and movable to a position in the path of the piston means, a solenoid on said body, a core for said solenoid, said plunger being secured to said core, said solenoid being constructed to pull the core so that the plunger end thereof clears said resilient means, said plunger having a slot therein, said body having a member adapted to enter said plunger slot in one position of said plunger, and means for closing the other end of said bore, said closure means having a hole therein adapted to receive the tip of a tool.

HENRY C. FREED.